United States Patent
Kajitani

(10) Patent No.: US 6,496,577 B1
(45) Date of Patent: Dec. 17, 2002

(54) SIGNAL TRANSMISSION FOR TRANSMITTING MESSAGE TO DESTINATION

(75) Inventor: Masahiro Kajitani, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/291,326

(22) Filed: Apr. 15, 1999

(30) Foreign Application Priority Data

Apr. 15, 1998 (JP) ............................................ 10-119932

(51) Int. Cl.[7] ........................ H04M 3/42; H04M 7/00; H04M 1/24; H04B 7/00
(52) U.S. Cl. ............. 379/207.11; 379/219; 379/220.01; 379/221.01; 379/14; 379/455; 379/414; 379/500; 455/414; 455/500
(58) Field of Search ........................ 379/14, 207, 219, 379/220.01, 221.01; 455/414, 500

(56) References Cited

U.S. PATENT DOCUMENTS

| | | | | |
|---|---|---|---|---|
| 5,930,700 A | * | 7/1999 | Pepper et al. | |
| 6,028,914 A | * | 2/2000 | Lin et al. | |
| 6,085,101 A | * | 7/2000 | Jain et al. | |

FOREIGN PATENT DOCUMENTS

| | | |
|---|---|---|
| JP | 7-250081 | 9/1995 |
| JP | 8-265436 | 10/1996 |
| JP | 9-130405 | 5/1997 |
| JP | 9-214540 | 8/1997 |

* cited by examiner

*Primary Examiner*—Ahmad F. Matar
*Assistant Examiner*—Thjuan P Knowlin
(74) *Attorney, Agent, or Firm*—Foley & Lardner

(57) ABSTRACT

A signal transmission system includes a plurality of long distance signaling transfer point (L-STP) stations, each of which includes a plurality of regional signaling transfer point (R-STP) stations, each of which includes a plurality of signaling end point (SEP) stations. One of the plurality of SEP stations as an originating SEP station transmits a message to another of the plurality of SEP stations as a destination SEP station, the message having a header section including a point code of the destination SEP station as a DPC. One of the plurality of R-STP stations including the originating SEP station as an originating side R-STP station determines one of a route to the destination SEP station, a route to one of the plurality of R-STP stations including the destination SEP station as a destination side R-STP station, and a route to one of the plurality of L-STP stations including the destination side R-STP station as a destination side L-STP station, based on the DPC in the header section of the message, and transfers the message based on the determined route.

20 Claims, 5 Drawing Sheets

Fig.3

|   | DPC<br>(ARRIVAL POINT CODE) | LGN<br>(ROUTE) | TYPE<br>(ROUTING TYPE) |
|---|---|---|---|
| 1 | A-B-A | 1 | FULL |
| 2 | A-B-B | 2 | FULL |
| 3 | A-B-C | 3 | FULL |
| ⋮ | ⋮ |  | ⋮ |
| 10 | A-C | 4 | PARTIAL |
| 11 | A-D | 5 | PARTIAL |
| ⋮ | ⋮ |  | ⋮ |
| 20 | -(ALL PCS) | 6 | DEFAULT |
| ⋮ | ⋮ | ⋮ | ⋮ |

SIGNAL TRANSMISSION FOR TRANSMITTING MESSAGE TO DESTINATION

BACKGROUND OF THE INVENTION

1. Field of the Invention

The present invention relates to a signal transmission system, and more particularly to a signal transmission system suitable for a network service in a network when subscribers increase.

2. Description of the Related Art

The extension of a portable phone service area advances rapidly at present. Also, a system for a service area transfers a subscriber data to another system for another service area so that a subscriber can receive same service regardless of service area even if the subscriber moves from the service area to the other service area. This service is called roaming service.

Because a conventional portable phone service is originally provided only in a great city, the signal between the systems is connected in PC-PC. The PC is a point code, the PC-PC means the PC of a call originating subscriber and the PC of a call receiving subscriber. The routing of a message is performed in accordance with the point code.

FIG. 1 is a block diagram illustrating a general structure of a signal transmission network. In the figure, an elliptical block shows a node of the network and a line between the nodes shows a signal transmission path. A Signaling End Point (SEP) station in the elliptical block is a portable phone station and a Signaling Transfer Point (STP) station is a switch. Also, an R-STP station is a Regional STP station and an L-STP station is a Long distance STP station.

The STP station is provided with a Message Transfer Part (MTP) and the routing for a message is carried out in accordance with the PC-PC. However, if the call receiving PC or Destination Point Code (DPC) and a Linking Group Number (LGN) route corresponding to the DPC are not registered on the MTP, it is not possible to carry out the message transmission.

For example, it is supposed that a signal is transmitted from the SEP-A station to the SEP-Z station in FIG. 1. In this case, the SEP-A station transmits a signal in which a DPC of the SEP-Z station is written, to the R-STP station 1 which accommodates the SEP-A station. If the DPC of the SEP-Z is registered on the MTP of the R-STP station 1, so that a route is recorded to reach the SEP-Z station, the signal is sent out based on the recorded route. However, if the DPC of the SEP-Z station is not registered on the MTP of the R-STP station 1, the signal can not be transmitted.

However, with the extension of the service are on the network, a new station is opened so that the number of stations increases. Thus, it has become impossible for the R-STP to manage all the PCs in the whole network. Therefore, in the conventional signal transmission system, there is a problem in that a signal can not be transmitted to an SEP whose PC is not yet registered.

In conjunction with the above description, a path managing method in an ATM-LAN is described in Japanese Laid Open Patent Application (JP-A-Heisei 7-250081). In this reference, a path management data in a path control server PCS1 is inputted and updated in advance in accordance with the structure change of the ATM-LAN. As to each of routers necessary to change the setting of new PVC and ATM switches corresponding to the routers, new routing data and connection data are acquired from the updated path management data and the routing data and connection data in the router R1 to R4 and the ATM switches SW1 and SW2 are set through communication lines Ca to C4 and C11 and C12.

Also, a network routing system is described in Japanese Laid Open Patent Application (JP-A-Heisei 8-265436). In this reference, when a passage avoiding relay station or a passage avoiding domain is written in a predetermined portion of a message, a message originating station extracts a route not to pass the passage avoiding relay station or the passage avoiding domain. Then, if there are transfer routes, the originating station determines one of the transfer routes by selecting means depending on individual routing systems to transmit to an adjacent station along the determined route. When the passage avoiding relay station or the passage avoiding domain is written in the predetermined portion of the message, a relay station extracts a route not to pass the passage avoiding relay station or the passage avoiding domain. Then, if there are transfer routes, the relay station determines one of the transfer routes by selecting means depending on the individual routing systems to transmit to an adjacent station along the determined route.

Also, an integrated radio communication method is described in Japanese Laid Open Patent Application (JP-A-Heisei 9-130405). In this reference, a radio LAN is used for communication between data terminals 3a to 3f located in a small domain and having high communication density. Also, an internet communication network 6 is used for high speed data transmission. The connection between the networks is controlled a gateway computer 1 positioned in each radio local area network. The gateway computer 1 specifies a route to a node of network and a mobile internet node which visits the node. A small size radio LAN can be configured in a home or small size office, and the gateway 10 is connected to more larger size network by the existing connection and corresponding data transmission network 8.

Also, a group management system in a network is described in Japanese Laid Open Patent Application (JP-A-Heisei 9-214540). In this reference, a terminal sends out a signal containing a transmission source address, a destination address and a type of protocol. Whether or not a destination belongs to the same group as the terminal is determined based on the type of protocol. When the terminal and the destination belong to the same group so that it is possible to communication between them, a routing process is carried out by routing processing means.

SUMMARY OF THE INVENTION

An object of the present invention is to provide a method and apparatus for signal transmission in which signal transmission is possible to an SEP in which a PC is not fully registered.

In order to achieve an aspect of the present invention, a signal transmission system includes a plurality of long distance signaling transfer point (L-STP) stations, each of which includes a plurality of regional signaling transfer point (R-STP) stations, each of which includes a plurality of signaling end point (SEP) stations. One of the plurality of SEP stations as an originating SEP station transmits a message to another of the plurality of SEP stations as a destination SEP station, the message having a header section including a point code of the destination SEP station as a DPC. One of the plurality of R-STP stations including the originating SEP station as an originating side R-STP station determines one of a route to the destination SEP station, a route to one of the plurality of R-STP stations including the destination SEP station as a destination side R-STP station, and a route to one of the plurality of L-STP stations including the destination side R-STP station as a destination side L-STP station, based on the DPC in the header section of the message, and transfers the message based on the determined route.

The originating side R-STP station may write a partial routing indicating data that the determined route is a partial route, in the header section of the message.

The originating side R-STP station preferably includes a routing data table in which full routes, partial routes and default routes are written, the full route indicating the route to the destination SEP station, the partial route indicating the route the destination side R-STP station, and the default route indicating the route to the destination side L-STP station. The originating side R-STP station refers to the routing data table based on the DPC to determine the route. In this case, the full routes are written in the routing data table for the plurality of SEP stations contained in the originating side R-STP station as a first group of SEP stations. Also, the partial routes are written in the routing data table for predetermined ones of the plurality of SEP stations as a second group of SEP stations other than the first group of SEP stations. Also the default routes are written in the routing data table for the plurality of SEP stations other than the first and second groups of SEP stations.

The originating side R-STP station writes a partial routing indicating data that the determined route is the partial route, in the header section of the message. In this case, the destination side R-STP station transfers the message to the destination SEP station based on the header section of the message including the partial routing indicating data.

Each of the plurality of SEP stations is a radio terminal.

In order to achieve another aspect of the present invention, a signal transmission method in a network including a plurality of long distance signaling transfer point (L-STP) stations, each of which includes a plurality of regional signaling transfer point (R-STP) stations, each of which includes a plurality of signaling end point (SEP) stations, includes:

transmitting from one of the plurality of SEP stations as an originating SEP station a message to another of the plurality of SEP stations as a destination SEP station, the message having a header section including a point code of the destination SEP station as a DPC;

determining a specific route by one of the plurality of R-STP stations including the originating SEP station as an originating side R-STP station, the specific route being one of a route to the destination SEP station, a route to one of the plurality of R-STP stations including the destination SEP station as a destination side R-STP station, and a route to one of the plurality of L-STP stations including the destination side R-STP station as a destination side L-STP station, based on the DPC in the header section of the message; and transferring the message for the destination SEP station based on the determined specific route.

BRIEF DESCRIPTION OF THE DRAWINGS

FIG. 3 is a format diagram illustrating an example of a routing data table used in the present invention;

DESCRIPTION OF THE PREFERRED EMBODIMENTS

A signal transmission system of the present invention will be described below in detail with reference to the attached drawings.

In the present invention, a signal is transmitted to a next node determined by a route data which is determined by a route determining method named a partial translation and a default translation. The next node carries out a more detailed route determination, if necessary. For instance, in the network shown in FIG. 1, the PCs of the SEP stations accommodated in an R-STP station 1 are all registered in the R-STP station 1 but the PC of another SEP station is not registered. Instead, it is supposed that routes common to all the SEP stations which are accommodated in the R-STP station 4, the R-STP station 5 and the R-STP station 6 are registered in the R-STP station. In this case, the number of PCs to be fully registered on the R-STP station 1 is equal to the number of SEP stations to be accommodated in the R-STP station 1. Also, the common routes to be registered are only 3 routes of the route to the R-STP station 5, the route to the R-STP station 6, the route to the R-STP station 4. Therefore, it is very simple. Thus, the R-STP station 1 needs not to consider the change of all the SEP stations which are accommodated in each of the R-STP station 5, the R-STP station 6 and the R-STP station 4.

It is supposed that the predetermined number of upper bits of the DPC indicates the R-STP station in which the SEP station indicated by the DPC is accommodated. In this case, a signal can be transmitted to an R-STP station in which a destination SEP station is accommodated if the DPC is set in the header section of the message even if the message is destined to any SEP station. This route determining method is called a partial translation routing method.

Figure 1:
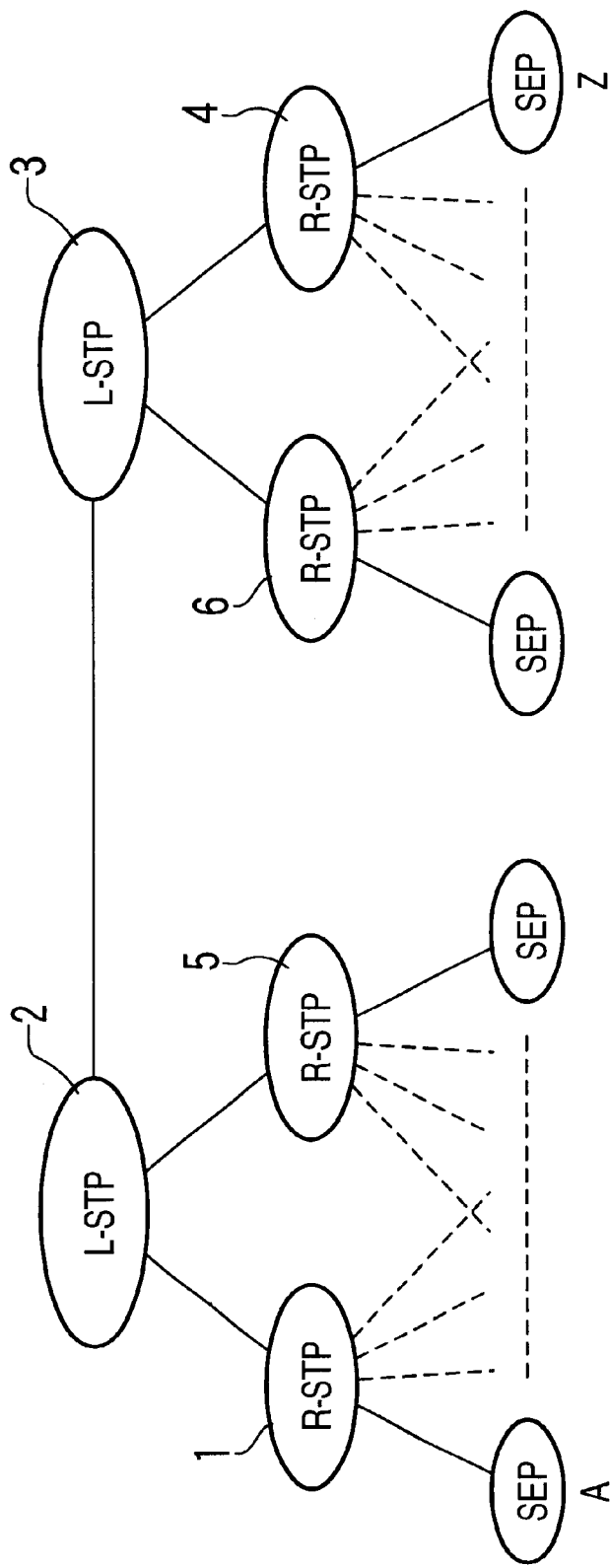
FIG. 1 is a block diagram illustrating an example of communication network.

Also, only the route to the R-STP station 5 may be registered as the R-STP station 1 common route in the network shown in FIG. 1. The routes to the R-STP station 6 and the R-STP station 4 may be not registered. In this case, it is possible to predetermine that a signal is transmitted to the L-STP station 3 through the L-STP station 2 through the unregistered route. The signal is transmitted to the destination SEP station based on the DPC by the L-STP station 3. This route determining method is called a default routing.

Figure 2:
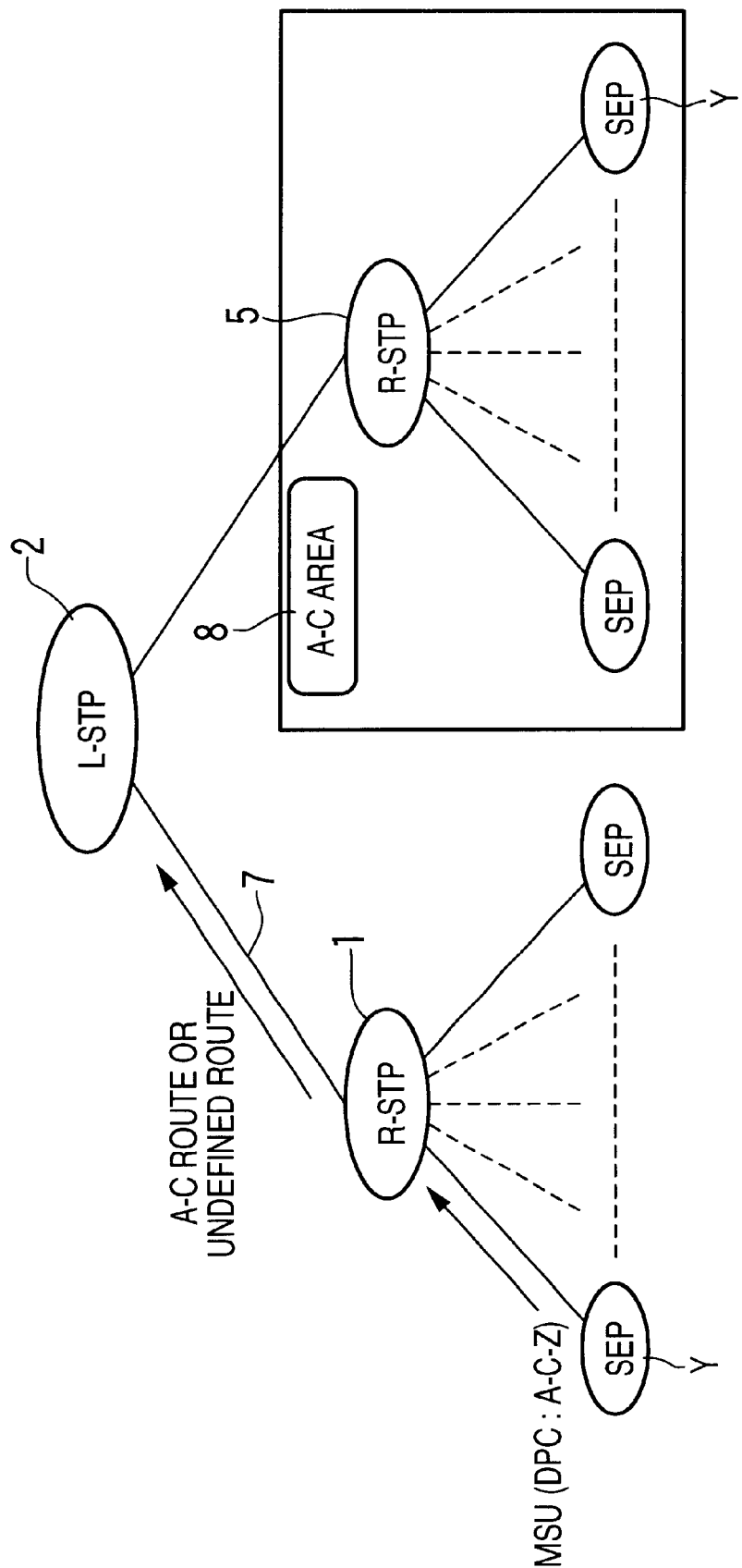
FIG. 2 is a block diagram illustrating the structure of a signal transmission system according to a first embodiment of the present invention.

FIG. 2 is a block diagram illustrating the structure of the signal transmission system according to the first embodiment of the present invention. In FIG. 2, the same reference numerals as those in FIG. 1 are allocated to the same components as those in FIG. 1, respectively. Thus, the description for the components will be omitted.

In an example shown in FIG. 2, a relay switch L-STP station 2 accommodates the R-STP switch stations 1 and 5. The MTP (Message Transfer Part) of the R-STP switch station 1 is provided with a routing data table. The total route data to all the SEP stations which are accommodated in the R-STP station 1 are registered on the full registration route columns in units of DPCs. Similarly, the MTP of the R-STP switch station 5 is provided with the routing data table and the total route data to all the SEP stations which are accommodated in the R-STP station 5 are registered on the full registration route column of the routing data table in units of DPCS.

It is now supposed that a message destined to the SEP station Y is transmitted from the SEP station A. The DPC of the SEP station Y is written in the header section of the message. The DPC of the SEP station Y is composed of the code of A-C-Y so as to mean the SEP station Y within the A-C area 8.

The SEP station in the A-C area is not registered on the full registration route column of the routing data table of the R-STP1. However, a part of the signal transmission route for the SEP station in the A-C area is registered on the partial registration route column of the routing data table of the R-STP station 1. Thus, the part of the signal transmission route can be referred to based on the upper portion A-C of the code of A-C-Y which is the DPC of the SEP station Y.

FIG. 3 is a format diagram illustrating an example of the routing data table. This is not the routing data table of the R-STP station 1 shown in FIG. 2. In this table, a transmission route (LGN: Linking Group Number) which corresponds to the destination point code (DPC) and a routing type are written. The routing type indicates that the type is which of the full registration route, the partial registration route or the default routing.

Referring to FIG. 2 again, the code A-C-Y is written in the header section of the message as the DPC of the destination SEP station Y and the message is transmitted from the SEP station A to the R-STP station 1. Because the code of A-C-Y is not present in the full registration route column of the routing data table of the R-STP station 1, the partial registration route column is referred to based on the upper portion A-C of the DPC. It is supposed at this time that LGN=4 is acquired. The message is transmitted in accordance with LGN=4 with no change of the DPC in the header section of the message and with a data indicative of a partial registration route as the routing type.

The message automatically reaches the R-STP station 5 via the LGN=4. The R-STP station 5 detects that the routing type is the partial registration route and connects the message to the SEP station Y indicated by the DPC.

Figure 4:
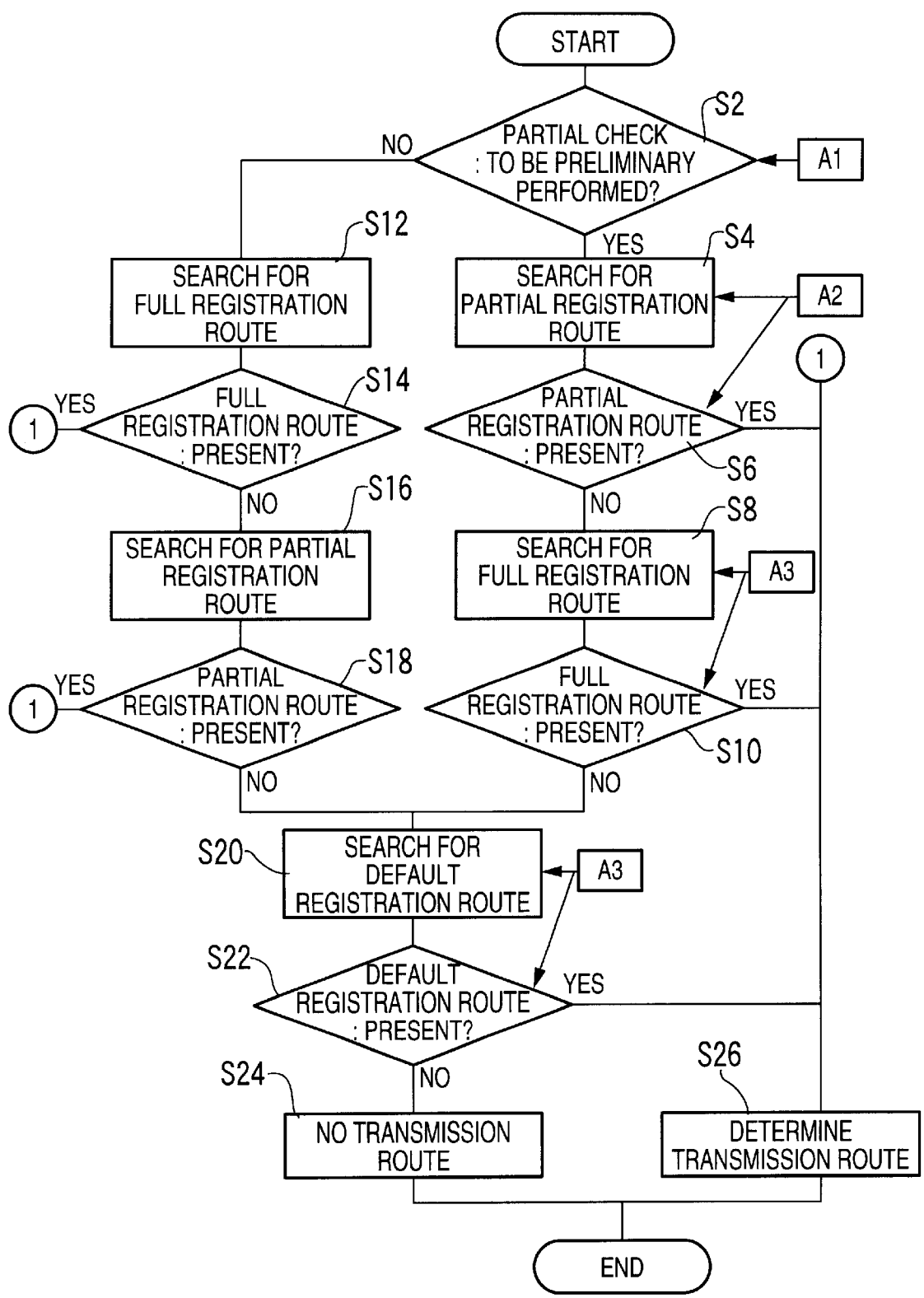
FIG. 4 is a flow chart illustrating a searching operation process of the routing data table of FIG. 3.

FIG. 4 is a flow chart illustrating a process in which the routing data table shown in FIG. 3 is referred to and the LGN is determined.

Referring to FIG. 4, the DPC is written in the routing label (header section) of the received message. The message is composed of package with a predetermined length of digital code, and the routing label is written in the header section of the package. As described above, the routing data table of FIG. 3 has the full registration route column, the partial registration route column, the default routing column.

It is determined in a step A1 whether or not the partial registration route is first to be carried out. This determination may be YES or NO. If the determination is NO, the searching operation of the full registration route is first carried out. The searching operation of the partial registration route is first carried out (Step A2), and the searching operation of the full registration route is carried out if the partial registration route is not registered (step A3). On contrary to this, when the searching operation of the full registration route is first carried out, if the full registration route is not registered, the searching operation of the partial registration route is next carried out. When any route is not registered in both of the full registration route and the partial registration route, the searching operation of the default registration route is carried out (Step A4).

Figure 5:
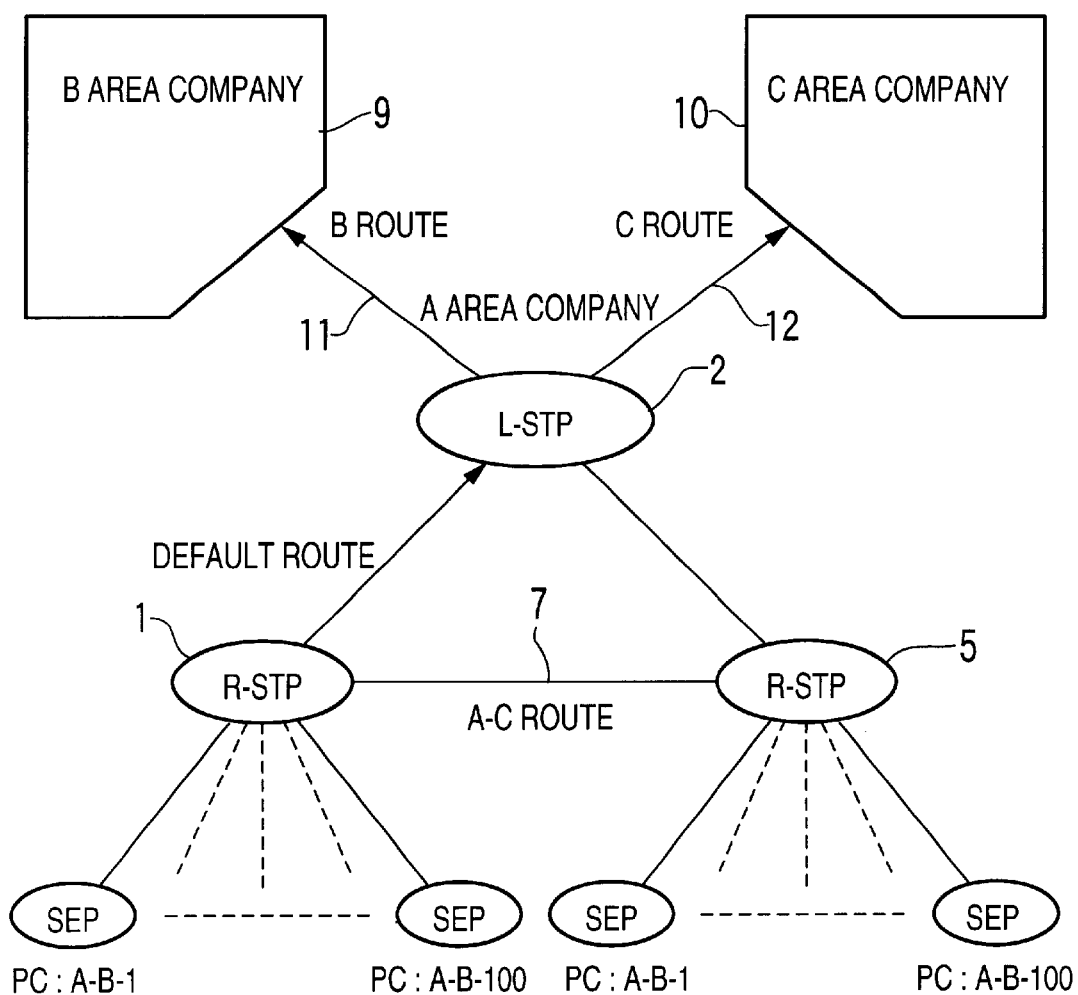
FIG. 5 is a block diagram illustrating the signal transmission system according to the second embodiment of the present invention.

FIG. 5 is a block diagram illustrating the signal transmission system according to the second embodiment of the present invention. In FIG. 5, the same reference numerals as those in FIG. 1 are allocated to the same components as those in FIG. 1, respectively. Each station of the R-STP station 1, the L-STP station 2 and the R-STP station 5 contains all the SEP stations shown in the figure and belongs to the A area company. However, the network for the communication supposes that it contains all stations belonging to a B area company 9 and all stations belonging to a C area company 10.

In such a case, in the routing data table of R-STP station 1, all the SEP stations having the DPCs from A-B-1 to A-B-100 which are accommodated in the R-STP station 1 are registered on the full registration route columns. Also, all the SEP stations having the DPCs from A-C-1 to A-C-100 are accommodated in the R-STP station 5 and are registered on the partial registration route columns of the routing data table of the R-STP station 5. The SEP stations which belong to the B area company 9 and the SEP stations which belong to the C area company 10 are registered on the default routing columns of the routing data table of the R-STP station 1.

It is supposed that a message to be transmitted from the SEP station which is accommodated in R-STP station 1 to the SEP station which belongs to the B area company 9 arrives at the R-STP station 1. The R-STP station 1 searches the routing data table of FIG. 3 based on the DPC written in the header section of the message in accordance with the flow shown in FIG. 4. First, the searching operation of the partial registration route in the step A2 is carried out. In this case, the route is not present. Therefore, the searching operation of the full registration route is carried out in the step A3. The route is not present even in the full registration route column. Therefore, the searching operation of the default registration route is carried out in the step A4. Because the route is registered, the message is sent out to the L-STP station 2 in accordance with the registered LGN. At this time, the DPC is remained in the header section of the message just as it is, and the data indicating that the routing is a default routing is written in the header section and then the message is sent out.

When receiving the message, the L-STP station 2 refers to the header section of the message and recognizes that the message is a message sent based on the default routing. Thus, the L-STP station 2 determines a route for the DPC at its own station. That is, the L-STP station 2 is provided with the routing data table. Whether the message should be sent out to the B route 11 of FIG. 5 or the C route 12 is defined in the partial registration route column based on the upper bits of the DPC.

In this case, the message is sent out to the B route 11 in accordance with the DPC in the header section of the message. The data indicating that the message is routed based on the partial registration route is written in the header section. The switch belonging to the B area company and has received the message determines a routing type (the partial registration route or the full registration route) in accordance with the DPC of the message and sends out for the destination SEP station.

As described above, according to the present invention, each R-STP station can determine the route to all the SEP stations in the network without considering the increase of the SEP stations other than the SEP stations belonging to a first predetermined group.

What is claimed is:

1. A signal transmission system including a plurality of long distance signaling transfer point (L-STP) stations, each of which includes a plurality of regional signaling transfer point (R-STP) stations, each of which includes a plurality of signaling end point (SEP) stations, wherein one of said plurality of SEP stations as an originating SEP station transmits a message to another of said plurality of SEP stations as a destination SEP station, said message having a header section including a point code of said destination SEP station as a DPC, and wherein one of said plurality of R-STP stations including said originating SEP station as an originating side R-STP station determines one of a route to said destination SEP station, a route to one of said plurality of R-STP stations including said destination SEP station as a destination side R-STP station, and a route to one of said plurality of L-STP stations including said destination side R-STP station as a destination side L-STP station, based on said DPC in said header section of said message, and transfers said message based on the determined route;

wherein said originating side R-STP station includes a routing data table in which full routes are written, said full routes indicating the route to said destination SEP station, and said originating side R-STP station refers to said routing data table based on said DPC to determine the route.

2. A signal transmission system according to claim 1, wherein said originating side R-STP station writes a partial routing indicating data that the determined route is a partial route, in said header section of said message.

3. A signal transmission system according to claim 1, wherein said full routes are written in said routing data table for said plurality of SEP stations contained in said originating side R-STP station as a first group of SEP stations.

4. A signal transmission system according to claim 3, wherein said partial routes are written in said routing data table for predetermined ones of said plurality of SEP stations as a second group of SEP stations other than said first group of SEP stations.

5. A signal transmission system according to claim 4, wherein said default routes are written in said routing data table for said plurality of SEP stations other than said first and second groups of SEP stations.

6. A signal transmission system according to claim 4, wherein said originating side R-STP station writes a partial routing indicating data that the determined route is the partial route, in said header section of said message.

7. A signal transmission system according to claim 6, wherein said destination side R-STP station transfers said message to said destination SEP station based on said header section of said message including the partial routing indicating data.

8. A signal transmission system according to claim 1, wherein each of said plurality of SEP stations is a radio terminal.

9. A signal transmission method in a network including a plurality of long distance signaling transfer point (L-STP) stations, each of which includes a plurality of regional signaling transfer point (R-STP) stations, each of which includes a plurality of signaling end point (SEP) stations, transmitting from one of said plurality of SEP stations as an originating SEP station a message to another of said plurality of SEP stations as a destination SEP station, said message having a header section including a point code of said destination SEP station as a DPC, and determining a specific route by one of said plurality of R-STP stations including said originating SEP station as an originating side R-STP station, the specific route being one of a route to said destination SEP station, a route to one of said plurality of R-STP stations including said destination SEP station as a destination side R-STP station, and a route to one of said plurality of L-STP stations including said destination side R-STP station as a destination side L-STP station, based on said DPC in said header section of said message, and transferring said message for said destination SEP station based on the determined specific route;

wherein said originating side R-STP station includes a routing data table in which full routes are written, said full routes indicating the route to said destination SEP station, and wherein said determining includes referring to said routing data table based on said DPC to determine the specific route.

10. A method according to claim 9, further comprising writing a partial routing indicating data that the determined route is a partial route, in said header section of said message by said originating side R-STP station.

11. A method according to claim 10, wherein said full routes are written in said routing data table for said plurality of SEP stations contained in said originating side R-STP station as a first group of SEP stations.

12. A method according to claim 11, wherein said partial routes are written in said routing data table for predetermined ones of said plurality of SEP stations as a second group of SEP stations other than said first group of SEP stations.

13. A method according to claim 10, wherein said default routes are written in said routing data table for said plurality of SEP stations other than said first and second groups of SEP stations.

14. A method according to claim 12, further comprising writing a partial routing indicating data that the determined route is the partial route, in said header section of said message by said originating side R-STP station.

15. A method according to claim 14, wherein said transferring includes transferring said message from said destination side R-STP station to said destination SEP station based on said header section of said message including the partial routing indicating data.

16. A method according to claim 9, wherein each of said plurality of SEP stations is a radio terminal.

17. A signal transmission system according to claim 1, wherein partial routes are written in said routing data table, said partial routes indicating the route to said destination side R-STP station.

18. A signal transmission system according to claim 1, wherein default routes are written in said routing data table, said default routes indicating the route to said destination side L-STP station.

19. A method according to claim 9, wherein partial routes are written in said routing data table, said partial routes indicating the route to said destination side R-STP station.

20. A method according to claim 9, wherein default routes are written in said routing data table, said default routes indicating the route to said destination side L-STP station.

* * * * *